United States Patent Office 3,536,991
Patented Oct. 27, 1970

3,536,991
DEVICE FOR BALANCING A THREE-PHASE ELECTRICAL NETWORK
Alexandr Nikolaevich Milyakh, Ul. Cheljuskintsev 15, kv. 31; Alexandr Dmitrievich Muzychenko, Ul. Umanskaya 33, kv. 52; and Anatoly Korneevich Shidlovsky, Chepurnoi per. 3, kv. 1, all of Kiev, U.S.S.R.
Filed Sept. 22, 1967, Ser. No. 669,814
Int. Cl. G05f 3/08
U.S. Cl. 323—45          1 Claim

ABSTRACT OF THE DISCLOSURE

A device for balancing a three-phase electrical network connected to a variable unbalanced load, comprises a magnetized autotransformer, the power winding of which is connected to two phases of the network, the variable unbalanced load being connected between the third phase of the network and the power winding of the autotransformer such that the angle of displacement between the voltage vector of the connected unbalanced load and the power winding is equal to $$\frac{\pi}{4}+\frac{\phi+\delta}{2}$$

where $\varphi$ is the phase angle of the unbalanced load and $\delta$ is the loss angle of the magnetized autotransformer, the magnetization of the autotransformer being effected by means of a positive feedback depending in the current of the unbalanced load. An electrical capacitance can be connected across one of the network phases and the power winding of the autotransformer.

---

The present invention relates to devices used for balancing a three-phase electrical network connected to an unbalanced load or—to be more exact—a variable unbalanced load.

Known in the art are balancers for similar purposes made up of autotransformers, electrical capacitances and inductances.

The above-mentioned devices are either of an uncontrolled type in which case the efficiency of balancing is rather poor, or are controlled by a relay-contactor system, in which case the reliability of operation is low and the cost of maintenance is high.

Control of the inherent capacitance and inductance of balancers is essential as any change in the unbaalnced loads calls for a corresponding change in capacitance and inductance for maintaining balanced load conditions of the network.

Certain difficulties are encountered in the development of a noncontact controlled balanced due to the necessity of insuring an adequate noncontact control of the electrical capacitance and inductance of this device.

Even if noncontact control of the inductance can be brought about by the employment of magnetizing choke coils, noncontact control of the capacitance can be provided only by indirect means, that is, by the use of parallel-connected magnetizing choke coils.

This results in an unjustified increase in the installed capacity and, consequently, in the consumption of copper and steel per unit of capacity of the balancer.

A primary object of the present invention is to provide a noncontact controlled balancer of low installed capacity for use in three-phase electrical networks, this balancer being controlled by means of a single controllable element.

This object is achieved in the device for balancing a three-phase electrical network with a D.C.-magnetized autotransformer whose power winding is connected to two phase of the three-phase network, and an unbalanced single-phase load which is switched in between the third phase of the three-phase network and the tap of said power winding of the autotransformer by providing, according to the invention, for an angle of displacement between the load voltage vector and the voltage of said power winding of the autotransformer equal to $$\frac{\pi}{4}+\frac{\phi+\delta}{2}$$

where $\varphi$ is the load phase angle, and $\delta$ is the loss angle of said magnetized autotransformer.

It is recommended to improve the power factor of the balanced three-phase network at the same installed capacity of the balancer by connecting an electrical capacitance across one of the network phases and the autotransformer winding so that the angle of displacement between the vectors of the capacitance voltage and the autotransformer power winding voltage amounts to $$\frac{\pi-\delta}{2}$$

The present invention will further be described with reference to the accompanying drawings, wherein.

Figure 1:
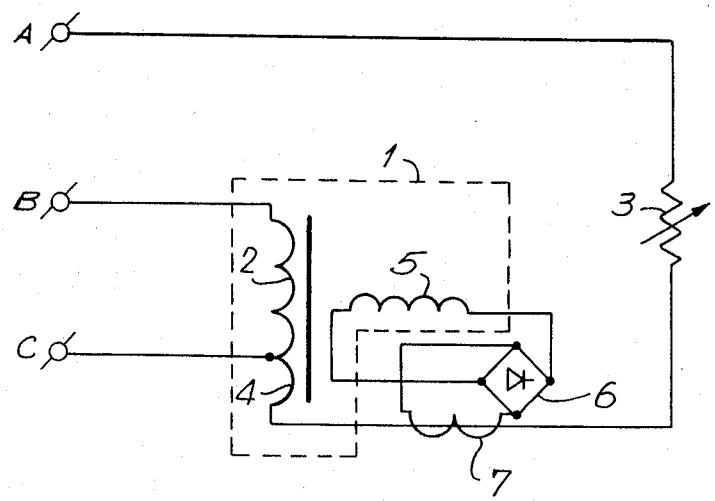
FIG. 1 shows the elementary circuit diagram of the balancer in accordance with the invention proposed herein.

As seen in FIG. 1, the device for balancing a three-phase network (phases A, B and C) comprises magnetized autotransformer 1, power winding 2 of which is connected to phases B and C, whereas unbalanced load 3 is connected across phase A and the tap of winding 4 of autotransformer 1.

Control winding 5 of magnetized autotransformer 1 is supplied from current transformer 7 through rectifier bridge circuit 6.

Windings 2 and 4 are fitted on the extreme limbs of the E-shaped core of autotransformer 1 so that an A.C. electromotive force is not induced in control winding 5 fitted on the middle limb of the E-shaped core. To this end, each of windings 2 and 4 of autotransformer 1 is divided into two parts having an equal number of turns and these parts of the windings are arranged on different extreme limbs of the core (not shown in FIG. 1).

Load 3 and power winding 2 of autotransformer 1 (see FIG. 2) are connected so that the angle between vector $V_1$ of the voltage of load 3 and vector $V_2$ of the voltage of winding 2 equals $$\frac{\pi}{4}+\frac{\varphi+\delta}{2}$$

where $\varphi$ is the phase angle of the load and $\delta$ is the loss angle of the magnetized autotransformer.

The balancer proposed herein operates in the following manner.

Single-phase variable loads set up a flow of reverse-sequence currents in the three-phase network that disturb its normal conditions of operation. The magnitude of the reverse-sequence currents depends upon the changes in load 3 (see FIG. 1).

Balancer winding 2 that is magnetized by the direct current of winding 5 establishes a flow of compensating reverse-sequence currents in the three-phase network. The value of these compensating currents can be varied by changing the current of winding 5.

In order to balance the three-phase network, the reverse-sequence currents due to the load connected to the three-phase network are to be equal in value and in opposition to the reverse-sequence currents set up in the three-phase network by the magnetization of autotransformer 1.

The above-mentioned currents are set in opposition by making the angle between vectors $V_1$ and $V_2$ of the voltages of load 3 and power winding 2 equal to $$\frac{\pi}{4}+\frac{\varphi+\delta}{2}$$

Figure 2:
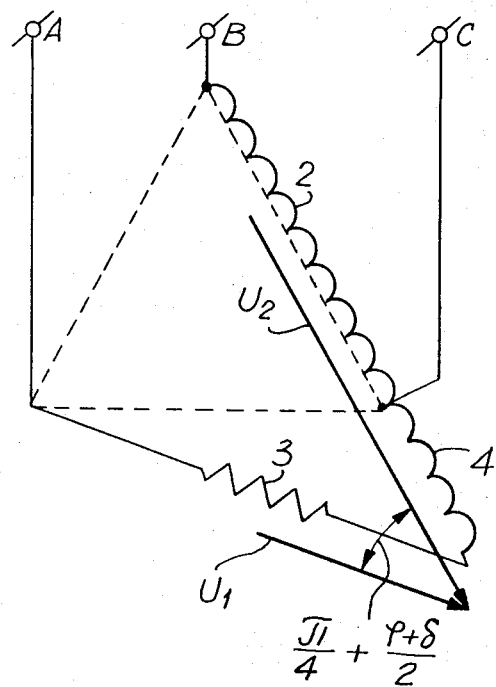
FIG. 2 shows the topographic voltage diagram explaining the operation of the balancer represented in FIG. 1.

(see FIG. 2).

Balance conditions of the three-phase network are maintained at changes in load 3 by means of a positive feedback provided by current transformer 7 and rectifier bridge circuit 6. The direct current flowing through control winding 5 increases with increasing load 3 and, as a result, the reverse-sequence currents generated by winding 2 of autotransformer 1 also increase. These reverse-sequence currents are compensated and, consequently, the three-phase network is balanced.

At a drop in load 3, the current flowing through winding 5 decreases and, as a result, balance conditions are established again.

Figure 3:
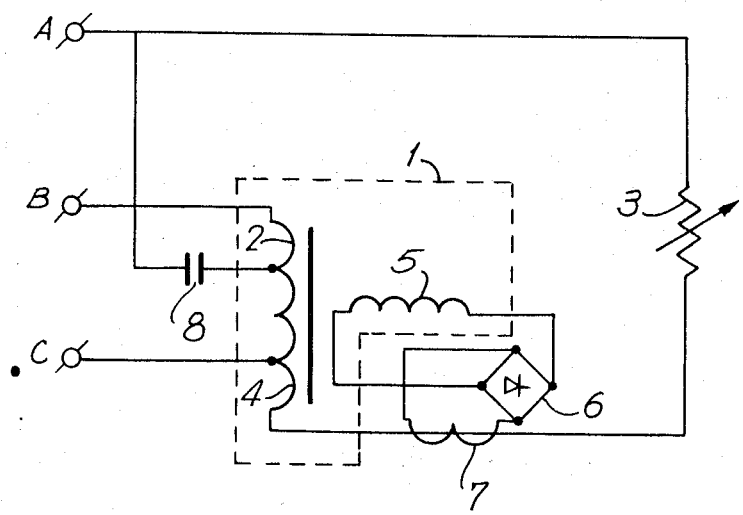
FIG. 3 shows the elementary circuit diagram of the same balancer with an additionally connecetd electrical capacitance.
Figure 4:
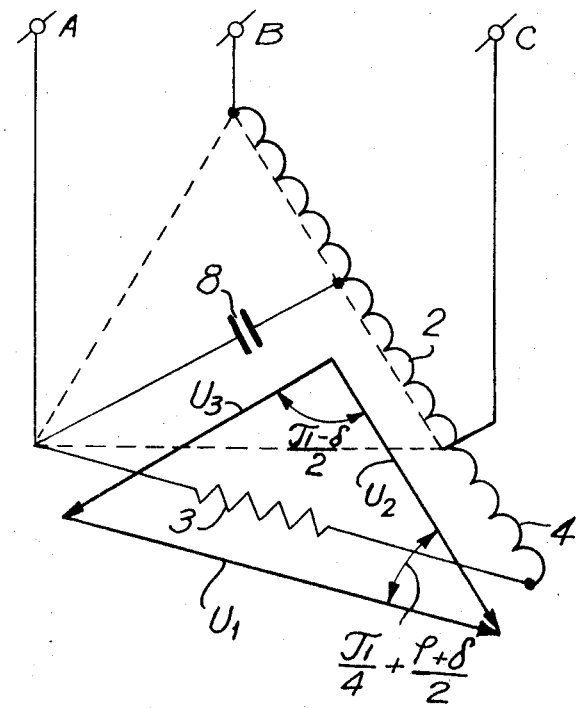
FIG. 4 shows the topographic voltage diagram explaining the operation of the balancer represented in FIG. 3.

The power factor of the balanced three-phase network is improved by connecting uncontrolled capacitance 8 across phase A and the tap brought out from the middle of winding 2 of autotransformer 1 (see FIG. 3). In this case, capacitance 8 improves the power factor and balances load 3. This occurs when the reverse-sequence currents due to the connection of the capacitance to the three-phase network are in opposition to the reverse-sequence currents due to the load of the same network. This is attained, according to the present invention, by connecting the capacitance to a voltage, vector $V_3$ of which is at an angle of $$\frac{\pi-\delta}{2}$$

to vector $V_2$ of the voltage of a winding 2 (see FIG. 4).

At failure of capacitance 8 and its subsequent removal the balancer continues to operate normally with a slightly lower capacity and at a lower power factor.

It is advisable that the reactance of capacitance 8 be two to three times as low as the reactance of the magnetized choke coil.

The above described balancer maintains a balance of the three-phase network at connection of a variable unbalanced load to the latter; in this case the balancer is controlled by means of a single noncontact controllable element (the magnetized autotransformer). The installed capacity of the balancer amounts to 121 percent of the rated unbalanced load. The balancer proposed herein ensures a high reliability of operation and can be used for balancing a network connected to one or two single-phase loads, the value of which is liable to vary in the course of time.

These balancers can be used for balancing three-phase networks connected to induction furnaces and mixers, commercial-frequency single-phase railway contact lines, welding sets and other powerful unbalanced consumers liable to disturb the balance of three-phase networks.

What we claim is:

1. A device for balancing the operating conditions of a three-phase electrical network, said device comprising a D.C.-magnetized autotransformer including a control winding and a power winding which is connected to two phases of said three-phase electrical network, and an unbalanced single-phase load connected between the third phase of said three-phase network and said power winding of said autotransformer such that the angle of displacement between the voltage vector of said unbalanced load and that of the autotransformer power winding is equal to $$\frac{\pi}{4}+\frac{\varphi+\delta}{2}$$

where $\varphi$ is the phase angle of the unbalanced single-phase load and $\delta$ is the loss angle of said magnetized autotransformer, capacitance connected between one phase of said network and the power winding of said autotransformer, the angle of displacement between the voltage vector of said capacitance and that of said power winding being equal to $$\frac{\pi-\delta}{2}$$

and means for magnetizing the autotransformer including a positive feedback means connected to the control winding of the autotransformer for effecting magnetization in accordance with the current in the unbalanced load.

References Cited

UNITED STATES PATENTS

| | | | |
|---|---|---|---|
| 3,209,239 | 9/1965 | D'Agostino | 323—45 |
| 3,252,079 | 5/1966 | Dortort | 323—45 |
| 3,365,657 | 1/1968 | Webb | 323—56 |
| 3,004,208 | 10/1961 | Williamson | 321—57 |

J D MILLER, Primary Examiner

G. GOLDBERG, Assistant Examiner

U.S. Cl. X.R.

317—14; 323—56, 60, 101, 110